(12) United States Patent  
Barnes

(10) Patent No.: US 7,315,581 B2  
(45) Date of Patent: Jan. 1, 2008

(54) METHOD FOR POWER DETECTION OF MULTICARRIER SIGNALS, RADIO TRANSMISSION UNIT AND MODULE FOR SUCH A UNIT

(75) Inventor: Kai Barnes, Kempele (FI)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 10/471,630

(22) PCT Filed: Mar. 14, 2001

(86) PCT No.: PCT/EP01/02834

§ 371 (c)(1),
(2), (4) Date: Sep. 12, 2003

(87) PCT Pub. No.: WO02/073841

PCT Pub. Date: Sep. 19, 2002

(65) Prior Publication Data

US 2004/0095895 A1    May 20, 2004

(51) Int. Cl.
*H04I 27/00* (2006.01)

(52) U.S. Cl. .................................................... 375/297

(58) Field of Classification Search ............... 375/297, 375/296, 295; 340/500, 693.3, 693.1; 455/7, 455/11.1, 12.1, 13.4, 522, 517, 507, 500, 455/39, 114.3, 114.2, 91, 127.1
See application file for complete search history.

(56) References Cited

U.S. PATENT DOCUMENTS 5,799,005 A    8/1998    Soliman 5,933,423 A    8/1999    Laakso et al.

FOREIGN PATENT DOCUMENTS

EP    0 899 923 A1    3/1999  
WO    WO 01/03097 A1    1/2001

OTHER PUBLICATIONS

ETSI TS 101 350 v7.1.0, Nov. 1999, Technical Specification, "Digital Cellular telecommunications system (Phase 2+); General Packet Radio Service (GPRS); Overall description of the GPRS radio interface; Stage 2 (GSM 03.64 version 7.1.0 Release 1998)".
Draft GSM 05.05 V8.4.0 (Apr. 2000); "Digital Cellular Telecommunications system (Phase 2+); Radio Transmission and reception (GSM 05.05 version 8.4.0 Release 1999" ETSI, pp. 1-104.

*Primary Examiner*—Pankaj Kumar
(74) *Attorney, Agent, or Firm*—Squire, Sanders & Dempsey L.L.P.

(57) ABSTRACT

A method for determining the power of signals transmitted by a radio transmission unit with several carriers over the air interface. In order to allow for a simple power detection of multicarrier signals while the air-interface is not used for data transmission, the method includes transmitting a modulated signal using a first carrier and determining its power, transmitting additionally a modulated signal using a further carrier, determining the total power of the sum of the modulated signals transmitted with the first and the further carrier, and determining the power of the modulated signal using the further carrier by subtracting the first determined power from the determined total power. The invention equally relates to a corresponding radio transmission unit and to a corresponding module for such a unit.

27 Claims, 5 Drawing Sheets

METHOD FOR POWER DETECTION OF MULTICARRIER SIGNALS, RADIO TRANSMISSION UNIT AND MODULE FOR SUCH A UNIT

FIELD OF THE INVENTION

The invention relates to a method for determining the power of signals transmitted by a radio transmission unit with at least two different carriers over the air interface. The invention equally relates to a radio transmission unit for a radio communications system and to a module for such a radio transmission unit.

BACKGROUND OF THE INVENTION

Radio transmission units of a radio communications system employing simultaneously a plurality of carriers of different frequencies for transmission of signals are known from the state of the art. With the currently employed technology, such radio transmission units have to comprise a plurality of single-carrier transmitters of which each is capable of transmitting only a single modulated carrier at the same time. With future technology, such radio transmission units may comprise instead one or more multicarrier transmitters, each of which is capable of transmitting several modulated carriers simultaneously. The carriers are usually modulated with modulated signals that are to be transmitted.

The power control of the transmission with the different carriers is an important aspect in the employment of signals using different carriers. Therefore, the present power of the signals transmitted by the radio transmission unit has to be known for each of the different carriers in order to enable an efficient power control. The determination of the actual power of the different carriers in the radio transmission unit is difficult, though, if the transmitted signals using different carriers can only be obtained as a combined output signal. In particular for a digital open-loop power control, the corresponding information has to be obtained in the transmitting radio transmission unit itself.

Summing several modulated signals using different carriers leads to an envelope with heavy fluctuations. Based on such an envelope, there is no simple way to detect the power of each carrier separately. A detection would rather have to be based on complex and possibly inaccurate implementations.

SUMMARY OF THE INVENTION

It is an object of the invention to provide a method, a radio transmission unit and a module for such a unit allowing for a simple power detection of multicarrier signals.

This object is reached on the one hand with a method for determining the power of signals transmitted by a radio transmission unit with at least two different carriers over the air interface while the air-interface is not used for data transmission, comprising:

a) transmitting a modulated signal using a first one of said at least two carriers with a constant power level;
b) detecting said transmitted modulated signal and determining its power;
c) transmitting a modulated signal using said first carrier with said constant power level and transmitting simultaneously an identically modulated signal using a further one of said at least two carriers with a constant power level;
d) detecting the sum of the identically modulated transmitted signals using said first and said further carrier and determining the total power of the sum of the modulated signals; and
e) determining the power of the modulated signal using said further carrier by subtracting the power determined in step b) from the total power determined in step d).

On the other hand, the object is reached with a radio transmission unit for a radio communications system comprising: means for transmitting signals with carriers of different frequencies; controlling means for controlling the transmission of signals in a way that said means for transmitting signals transmit at one time a modulated signal using a first carrier with a constant power level and at a different time simultaneously a modulated signal using said first carrier with said constant power level and an identically modulated signal using a further carrier with a constant power level, while no data transmission is ongoing; detecting means for detecting the transmitted modulated signal using only the first carrier and the sum of the identically modulated signals transmitted simultaneously using the first and the further carrier; and processing means for determining the power of the signal transmitted only using the first carrier detected by the detecting means and the total power of the sum of the signals transmitted using two carriers detected by the detecting means, and for subtracting the power of the separately transmitted signal from the total power in order to obtain the power of the signal transmitted using the further carrier.

Finally, the object of the invention is reached with a module comprising the controlling means and/or the processing means of such a radio transmission unit.

The invention proceeds from the idea that the summing of two similarly modulated signals with different centre frequencies will result in a signal of which the power can be determined easily compared to the power of summed modulated signals. It is therefore proposed not to try to separate carrier powers once they have been summed up but to use only two carriers as basis for two identically modulated signals at the same time. The two identically modulated signals can be obtained in particular by modulating the two selected carriers with an identical modulated symbol (bit) pattern. Moreover, the power of one of the carriers is determined separately while transmitting exclusively a modulated signal using only this carrier, which power is subtracted from the power of the combined signal. The resulting difference constitutes the power of the signals transmitted with the second carrier.

The order of determining the power of a signal using a single carrier and the power of summed signals can obviously be changed.

The radio transmission unit can be in particular a base station, but it can equally be any other radio terminal of a radio communications system transmitting multicarrier signals.

Preferred embodiments of the invention become apparent from the subclaims.

In one preferred embodiment of the invention, the modulation method used for creating the modulated signals is a modulation method that results in a constant envelope of the modulated signal. In this case, the power of detected signals can be determined easily by determining the amplitude of the envelope of the respective detected signals, since the peak value of the modulated signal is directly linked to the amplitude of the envelope of constant level. Moreover, the summing of such modulated signals using carriers with different frequencies results in a simple amplitude modulated envelope that can be detected easily. Since there is a direct relation between the peak value of the amplitude of such an amplitude modulated envelope and the mean power of the summed up signals, also a detection of the power of the summed up signals is enabled by evaluating the respective envelope.

In order to realise the method and the radio transmission unit of the invention, a time period has to be provided in which no data transmission takes place. Therefore, the method and the radio transmission unit of the invention can be realised most efficiently, by making use of a modulated signal transmitted in a predetermined dummy frame of a control channel—either dedicated or broadcast—that is not needed for network operation and during which data transmission on other channels is prevented. Instead of making use of a modulated signal transmitted in a predetermined dummy frame also a modulated signal transmitted in one or more predetermined dummy time slots in a predetermined frame of a control channel can be used. The use of such dummy time slots or frames assures at the same time that switching further carriers on in addition for a short time for transmitting a part of the symbol pattern of the control channel dummy burst will not disturb any other device operating in the same cell. The respective part of the symbol pattern then constitutes the identical symbol pattern transmitted with two carriers. The symbol pattern transmitted only using the first carrier can be, for example, either the symbol pattern of a complete time slot or frame during which no further carriers are switched on, or a part of the symbol pattern within one time slot or frame during which no further carriers are switched on.

The power is determined for all desired carriers by sending simultaneously a modulated signal using the first carrier and an identically modulated signal using the respective desired further carrier and by subtracting the previously determined power of only the first carrier. The order of the different steps for determining the different powers can be changed in any suitable manner. The power can be determined for all carriers that are available for transmission in the radio transmission unit or only for pre-determined ones. The power can be determined in particular for all carriers used by the radio transmission unit for frequency hopping.

The evaluation of the powers are most accurate, if the signals are transmitted at maximum power. They can be transmitted with any power level, though.

The main purpose of determining the powers of the different carriers is to be able to determine gain of the transmitter over the full transmission band or a specific part of it.

The gain on the transmission path can be calculated for each carrier for which the power was determined by dividing the determined power of the transmitted signals by the power present at the beginning of the transmission path, i.e. the power of modulated symbol patterns input to the means for transmitting signals of the radio transmission unit, which symbol patterns are used for modulating the respective carrier to form a modulated signal.

Preferably, at least some of the determined power values and/or gain values calculated from the power values are stored in a table in the radio transmission unit. They can then be accessed until the next determination of powers.

The gain on the transmission path for the different carriers depends on a variety of factors. Some of these factors, in particular the specific components employed in the radio transmission unit, contribute to the gain with a value that varies for the different frequencies of the transmission band, but generally only slowly over the time. An important factor that can lead to rather fast changes in the distribution over time, however, is temperature. Therefore, the power and/or the gain is preferably determined for a maximum period determined by the change in temperature. After this period, the power and/or the gain of the transmission path is determined anew for each carrier of interest. However, the detection of change in temperature is not needed. The invention overcomes the problems of gain variation that may occur when temperature changes also, if the powers are e.g. simply determined in specified intervals of time.

The determined power and/or gain values can be used in the radio transmission unit in particular to compensate for gain variations in the transmission path. The power detection according to the invention can be used in particular to calibrate the gain of the transmitter line-up in the radio transmission unit, i.e. an open-loop power control of the transmission power for the different carriers, for which the supply of reliable power information is of particular importance. The power detection according to the invention may be combined with any power control method, in particular any digital power control method for multicarrier transmission units.

The employment of the method and the radio transmission unit according to the invention can be seen in particular, though not exclusively, in TDMA (Time Division Multiple Access) systems.

BRIEF DESCRIPTION OF THE FIGURES

In the following, the invention is explained in more detail with reference to drawings, of which

DETAILED DESCRIPTION OF THE INVENTION

Figure 1:
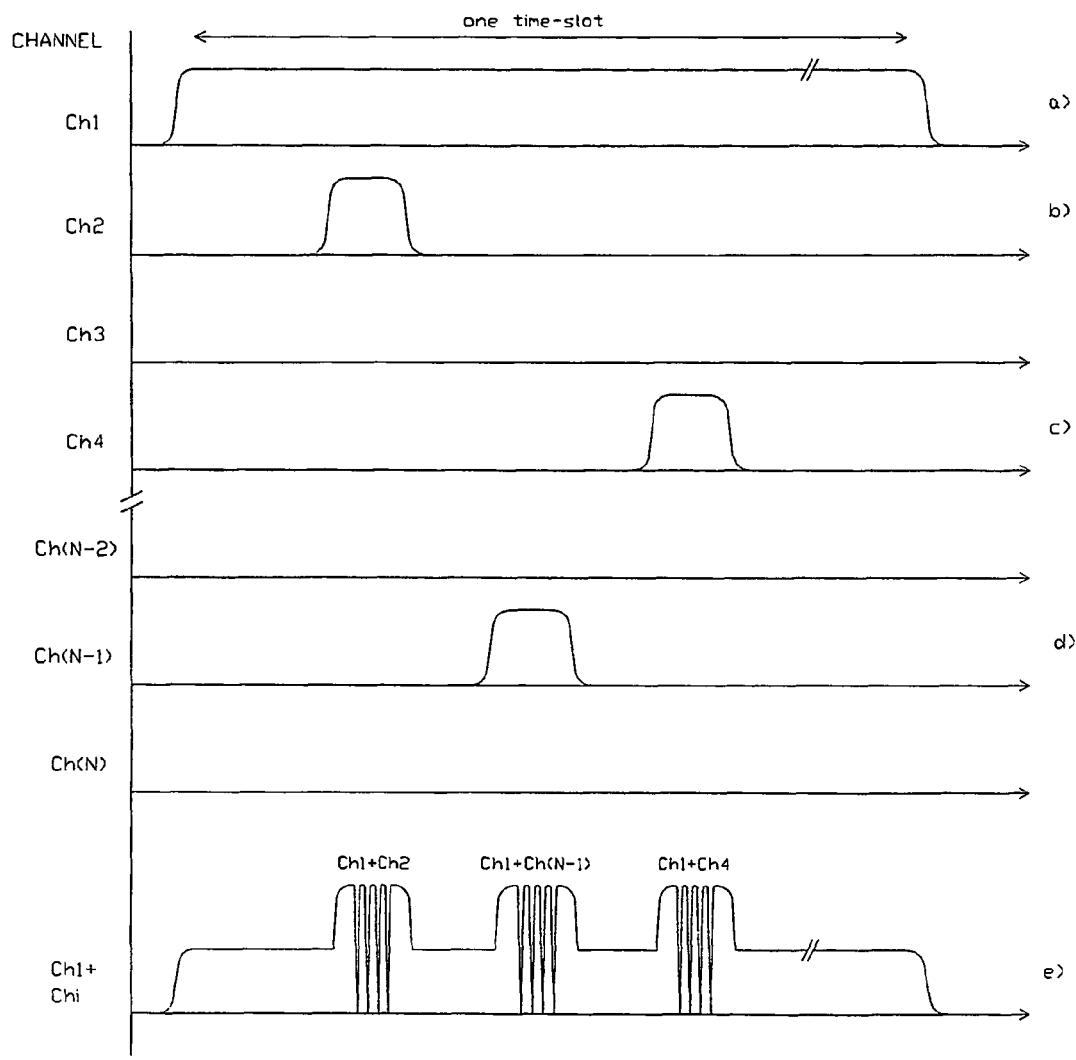
FIG. 1 illustrates the method according to the invention.
Figure 4:
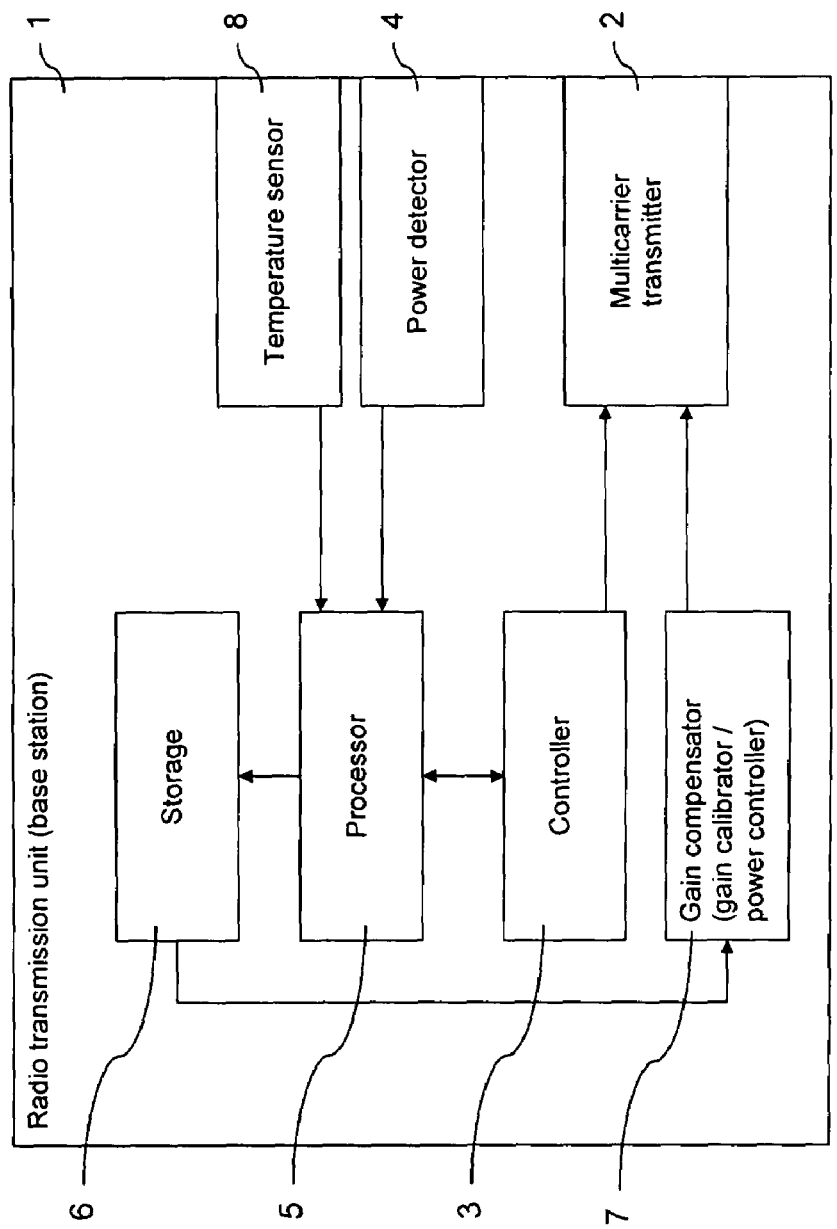
FIG. 4 is a schematic block diagram of a radio transmission unit according to an embodiment of the invention.
Figure 5:
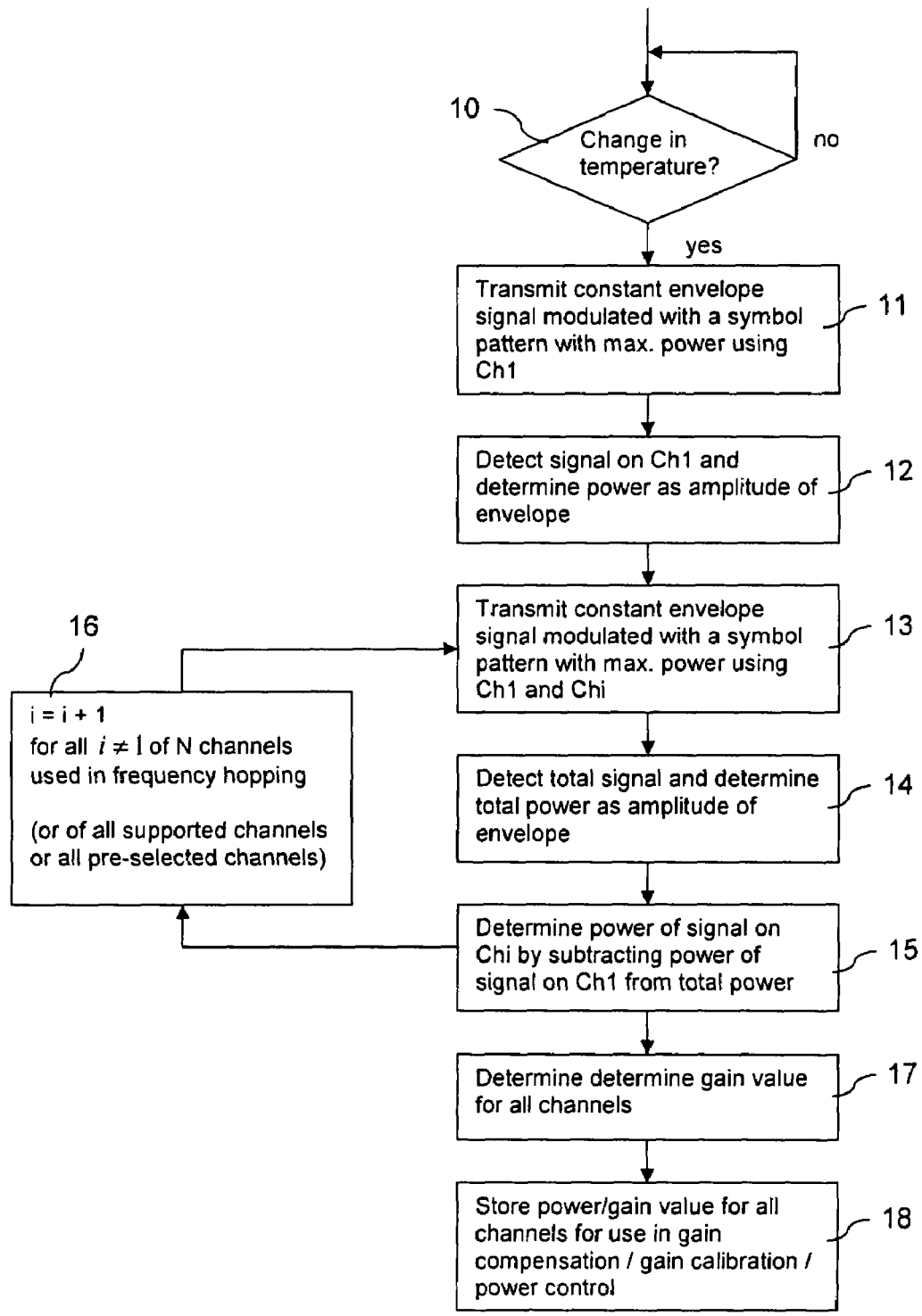
FIG. 5 is a flow chart illustrating the operation of the radio transmission unit of FIG. 4.

FIG. 1 illustrates the detection of the power of different carriers in a base station constituting a radio transmission unit according to the invention. The base station is shown in FIG. 4 and its operation in FIG. 5. The base station 1 comprises as means for transmitting signals a multicarrier transmitter 2 capable of transmitting N carriers of different frequencies. The carriers are used for transmitting information input to the multicarrier transmitter 2. More specifically, a certain baseband symbol pattern or sequence corresponding to such information is used for modulating the respective carrier in upconversion, thus forming a modulated signal. After amplification, the modulated signals are transmitted via an antenna over the air interface. The information that is transmitted using one of the carriers by the multicarrier transmitter 2 is provided by a controller 3 functioning as controlling means of the base station. The base station further comprises a detector 4 as detecting means for detecting signals, connected to a processor 5 functioning as processing means used for determining the power for the different carriers.

FIG. 1 is composed of several separate diagrams schematically showing the power over time for N channels Ch1 to Ch(N) using N different carriers and the power of a detected total signal Ch1+Chi, i indicating varying additional channels 2 to N over time. Five of the diagrams that are referred to in more detail in the following are identified in the figure by letters a)-e).

The base station 1 uses one channel Ch1 of a first carrier as control channel for transmitting control messages (step 11). A signal transmitted via the control channel is a modulated signal modulating the carrier assigned to the control channel Ch1.

In predetermined time slots of the control channel Ch1, a certain modulated signal is transmitted as approximately sinusoidal signal. The air interface is not used for data transmission during these predetermined time slots. The time slots rather constitute dummy time slots that are supposed to be insignificant for the operation of the network.

The transmitted signal is detected by the detector 4 of the base station 1 and forwarded to the processing means 5.

The envelope of the signal transmitted in the dummy time slot of the control channel corresponds to the one shown in FIG. 1a. The power of the transmitted signal is proportional to the peak value of the envelope according to the equation $P=u_{peak}^2/2$, where $u_{peak}$ is the peak value and where P is the RMS (root mean square) power of the transmitted signal. Since moreover the envelope is constant for the duration of the transmission of the modulated signal by itself, the power of the control channel and therefore of the first carrier can be measured easily (step 12). The measured power, in turn, can be used to determine the gain of the radio frequency path for the frequency of the first carrier (step 16).

After the power of the first carrier has been determined, a part of an identically modulated signal is transmitted in addition during the corresponding part of one of the dummy time slots on another channel Ch2 (step 13). The further channel Ch2 uses another carrier so that the additionally transmitted part of the identically modulated signal forms a further approximately sinusoidal signal with a different centre frequency. The envelope of the signal in channel Ch2 is shown in FIG. 1b). Since the transmission of the signal on the control channel Ch1 is continued as shown in FIG. 1a), the detector 4 of the base station 1 detects a summed signal, which is shown in FIG. 1e). Notches occurring during ramp up and ramp down are not shown for reasons of clarity. In the summed signal, the signal of channel Ch2 results in a first pulse, referred to in FIG. 1e) as Ch1+Ch2, rising over the constant envelope of the signal only transmitted by the first channel Ch1. The lengths of the pulse corresponds to the duration of the transmission on two channels. The detected pulse is an amplitude modulated signal with a sinusoidal envelope.

Figure 2:
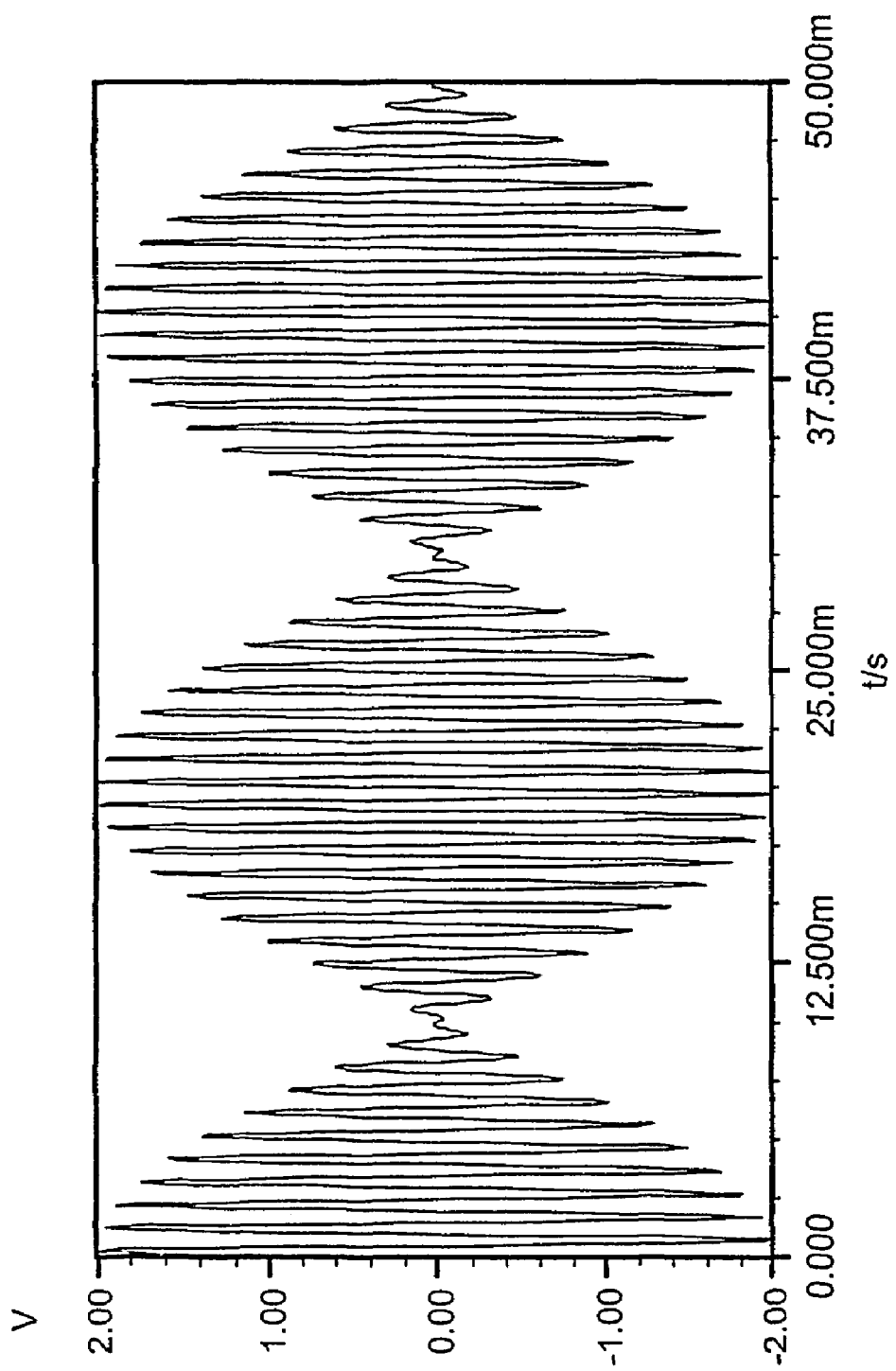
FIG. 2 shows the envelope of the sum of two sinusoidal signals.

For illustration, FIG. 2 shows the amplitude in volts of the sum of two sinusoidal signals with some frequency offset over time t/s for 50 ms. The difference between the frequencies determines the frequency of the amplitude modulation. The absolute values of the frequencies do not have any influence on the frequency of the amplitude modulation. The detection of a signal with a sinusoidal envelope is rather simple and there is a direct relation between the peak value of the envelope and the mean power of the summed signal.

Since the two carriers used by the base station 1 for transmitting simultaneously a part of a signal contain the same modulation but different centre frequencies, the detected sum of the signals will appear as an amplitude modulated signal with an envelope similar to the one shown in FIG. 2. As consequence, the total power of the summed signals transmitted on the control channel Ch1 and the second channel Ch2 can be determined easily in the processing means 5 by evaluating the envelope of the detected summed signals (step 14).

After the total power of the signals in the control channel Ch1 and the second channel Ch2 has been determined, the power of the second carrier is calculated in the processing means 5 by subtracting the previously determined power of the first carrier from the determined total power (step 15).

Then, the transmission of the signal on the second channel Ch2 is stopped, and instead, a part of an identically modulated signal is transmitted on a further channel Ch(N−1) using a further carrier as illustrated in FIG. 1d). The transmission of the modulated signal on the first channel is continued as can be seen in FIG. 1a) (step 16).

Just as described with reference to the second channel Ch2, the sum of the signals in the two channels Ch1, Ch(N−1) is detected at the base station 1. The detected sum is represented in FIG. 1e) by a second pulse referred to as Ch1+Ch(N−1). The total power of the summed signal is then determined by evaluating the peak of the envelope of the second pulse. Finally, the power of the further channel Ch(N−1) and therefore of the further used carrier is determined by subtracting the determined power of the first carrier from the determined total power (steps 13-15).

The same process is repeated for all carriers of one frequency hopping sequence, which may contain e.g. 64 frequencies. The order of the carriers for which the power is determined is irrelevant. The transmission for one more channel Ch4 is shown in FIG. 1c), and the detected pulse in the summed signal during transmission on this channel Ch4 can be seen in FIG. 1e), referred to as Ch1+Ch4. As a result, the power of all carriers used in a frequency hopping sequence is obtained. The gain for each carrier can easily be calculated, since the power of the signals input to the multicarrier transmitter 2 for each carrier is known (step 17).

The detection of the envelope of only the signal transmitted on the control channel Ch1 lies in time before the detection of the envelop depicted in FIG. 1e), but it corresponds exactly to the envelope shown in FIG. 1a). Alternatively to determining the power for the first carrier beforehand, e.g. even in a preceding separate dummy time slot, it could also be determined at the beginning of the time slot before the first additional carrier Ch2 is switched on, or in the time period between two of the resulting pulses, e.g. Ch1+Ch2 and Ch1+Ch(N−1) shown in FIG. 1e).

The profile of the frequency response, i.e. the gain values determined for the different frequencies, is stored in a table functioning as storage 6 or storing means in the base station 1. The stored values can then be used by a gain compensator 7 functioning as compensating means to compensate gain variations on the radio frequency path when setting the power level for each carrier (step 18). This is of particular importance for a multicarrier power control, where powers of separate signals cannot easily be measured. The gain compensator 7 can also be considered as gain calibrator/calibrating means or as transmission power controller/controlling means. A new profile can be determined and stored e.g. in predetermined periods of time.

In the whole, the invention enables an easy scanning of the whole frequency band available for transmission at the base station 1, or at least of a number of predetermined frequencies, like the frequencies used in frequency hopping. This, in turn, gives an information on the total gain on the transmission path for the frequencies used by the operator.

Figure 3:
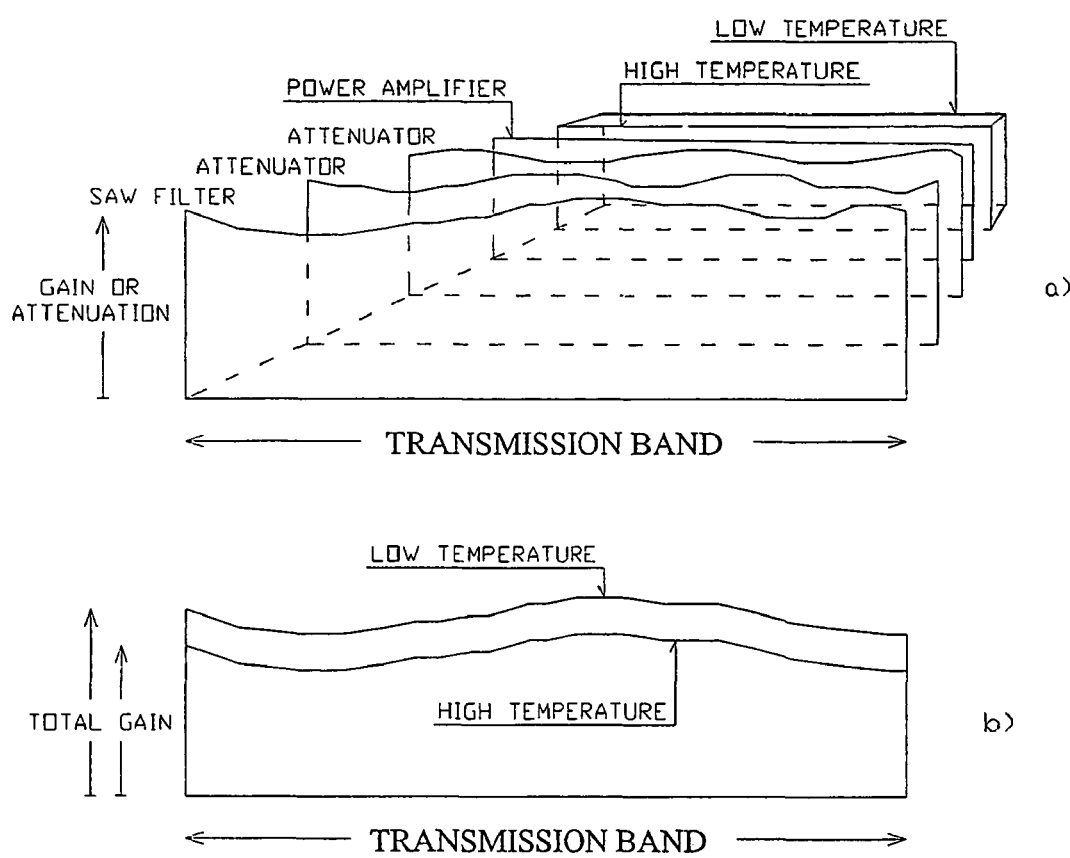
FIG. 3a schematically shows the frequency response of different components of a digital power control system.
FIG. 3b schematically shows the frequency response for different temperatures.

The total gain over the used frequency band is composed of a plurality of individual frequency responses and can vary on different channels using different carriers. FIG. 3a shows an estimation of the frequency response of different components on the transmission path. The gain or attenuation on the transmission path is depicted schematically over the transmission band of the system for a saw filter, two different attenuators, a power amplifier and two different temperatures (high/low).

As can be seen in more detail in FIG. 3b, a low temperature will lead to a higher total gain over the whole frequency band than a high temperature. Therefore, the base station 1 can comprise additionally a temperature sensor 8 as means for determining the actual temperature. A new profile of the frequency response will then be determined at the latest whenever a predetermined change in temperature was detected (step 10).

The detection of the temperature is not required, though. A goal of the invention is to enable the detection of the frequency response of the transmitter path depicted in FIG. 3b under the given conditions at the time of the detection. This information can then be utilised for power control purposes.

The invention claimed is:

1. Method for determining the power of signals transmitted by a radio transmission unit with at least two different carriers over the air interface while the air-interface is not used for data transmission, comprising:
   transmitting a modulated signal using a first one of said at least two carriers with a constant power level;
   detecting said transmitted modulated signal and determining its power;
   transmitting a modulated signal using said first carrier with said constant power level and transmitting simultaneously an identically modulated signal using a further one of said at least two carriers with a constant power level;
   detecting the sum of the identically modulated transmitted signals using said first and said further carrier and determining the total power of the sum of the modulated signals; and
   determining the power of the modulated signal using said further carrier by subtracting the power determined in detecting the transmitted modulated signal from the total power determined in detecting the sum of the identically modulated signal,
   wherein the determination of power of a signal transmitted in multicarrier signals results in a determination of power and/or gain values that are utilized in compensating for gain variations in a transmission path so as to enable efficient power control in a radio transmission unit.

2. Method according to claim 1, wherein the modulated signal using one of the at least two carriers is a signal with a constant envelope, and wherein the respective power is determined in detecting the transmitted modulated signal and in detecting the sum of the identically modulated signal by determining the amplitude of the envelope of the detected signal and of the sum of signals, respectively.

3. Method according to claim 1, wherein the modulated signal using the first carrier is obtained by modulating the first carrier with a modulated symbol pattern transmitted in a predetermined frame of a control channel of the radio transmission unit.

4. Method according to claim 1, wherein the modulated signals are transmitted at maximum power.

5. Method according to claim 1, further comprising repeating transmitting a modulated signal to determining the power of the modulated signal for all carriers for which the power is to be determined.

6. Method according to claim 5, wherein the power is determined for all carriers that are available for transmission in the radio transmission unit.

7. Method according to claim 5, wherein the power is determined for all carriers used by the radio transmission unit in frequency hopping for transmission.

8. Method according to claim 5, wherein the power is determined for pre-selected carriers available for transmission in the radio transmission unit.

9. Method according to claim 1, wherein for each carrier for which the power was determined the gain of the transmission path between the supply of a modulated symbol pattern used for modulating said carrier for obtaining the modulated signal using said carrier and the detection of the modulated signal using said carrier is determined based on the respective determined power.

10. Method according to claim 1, wherein the powers and/or gains are determined for a maximum period determined by the change in temperature.

11. Method according to claim 1, wherein at least some of the determined powers and/or gains are stored in a table in the radio transmission unit.

12. Method according to claim 1, wherein the determined powers and/or gains are used in the radio transmission unit for calibration.

13. Method according to claim 1, wherein the determined powers and/or gains are used in the radio transmission unit for power control of the transmission power for the different carriers.

14. Radio transmission unit for a radio communications system comprising:
   transmitter adapted to transmit signals with carriers of different frequencies;
   controller adapted to control the transmission of signals in a way that said transmitter transmits at one time a modulated signal using a first carrier with a constant power level and at a different time simultaneously a modulated signal using said first carrier with said constant power level and an identically modulated signal using a further carrier with a constant power level, while no data transmission is ongoing;
   detector adapted to detect the transmitted modulated signal using only the first carrier and the sum of the identically modulated signals transmitted simultaneously using the first and the further carrier; and
   processor adapted to determine the power of the signal transmitted only using the first carrier detected by the detector and the total power of the sum of the signals transmitted using two carriers detected by the detector, and for subtracting the power of the separately transmitted signal from the total power in order to obtain the power of the signal transmitted using the further carrier,
   wherein the system enables a determination of power of a signal transmitted in multicarrier signals such that power and/or gain values may be determined in order to compensate for gain variations in a transmission path to enable efficient power control in the radio transmission unit.

15. Radio transmission unit according to claim 14, wherein the processor is adapted to determine the power of the signal transmitted only using the first carrier and of the sum of the signals transmitted simultaneously using two carriers by determining the amplitude of the envelope of the respective detected signals.

16. Radio transmission unit according to claim 14, wherein the controller is adapted to control the transmission of signals in a way that the means for transmitter transmits a modulated signal using the first carrier obtained by modulating the first carrier with a modulated symbol pattern transmitted on a predetermined frame of a control channel used by the radio transmission unit.

17. Radio transmission unit according to claim 14, wherein the controller is adapted to control the transmission of signals in a way that the transmitter transmits the modulated signals using the first and the further carrier at maximum power.

18. Radio transmission unit according to claim 14, wherein as further carrier subsequently each carrier is used for which the power is to be determined.

19. Radio transmission unit according to claim 14, wherein the processor is adapted to determine for each carrier for which the power was determined the gain of the transmission path between the supply of a modulated symbol pattern used for modulating said carrier for obtaining the modulated signal using said carrier and the detection of the modulated signal using said carrier is determined based on the respective determined power.

20. Radio transmission unit according to claim 14, further comprising a storage adapted to store at least some of the determined power and/or gain values in a table.

21. Radio transmission unit according to claim 14, further comprising a calibrator adapted to calibrate the transmitter with the determined power and/or gain values.

22. Radio transmission unit according to claim 14, further comprising a controller adapted to control the transmission power employed for the different carriers in power control according to the determined power and/or gain values.

23. Radio transmission unit according to claim 14, further comprising a detector adapted to detect change in temperature, and to cause a new determination of powers by the controller, the detector and the processor after a predetermined change in temperature.

24. Module for a radio transmission unit of a radio communications system comprising a processor according to claim 14.

25. Module for a radio transmission unit of a radio communications system comprising a controller according to claim 14.

26. Radio transmission unit for a radio communications system, comprising:
means for transmitting signals with carriers of different frequencies;
means for controlling the transmission of signals in a way that said means for transmitting signals transmits at one time a modulated signal using a first carrier with a constant power level and at a different time simultaneously a modulated signal using said first carrier with said constant power level and an identically modulated signal using a further carrier with a constant power level, while no data transmission is ongoing;
detecting means for detecting the transmitted modulated signal using only the first carrier and the sum of the identically modulated signals transmitted simultaneously using the first and the further carrier; and
means for determining the power of the signal transmitted only using the first carrier detected by the means for detecting and the total power of the sum of the signals transmitted using two carriers detected by the means for detecting, and for subtracting the power of the separately transmitted signal from the total power in order to obtain the power of the signal transmitted using the further carrier,
wherein the system enables a determination of power of a signal transmitted in multicarrier signals such that power and/or gain values may be determined in order to compensate for gain variations in a transmission path to enable efficient power control in the radio transmission unit.

27. A system for determining power signals transmitted in multicarrier signals, comprising:
transmitter adapted to transmit signals with carriers of different frequencies;
controller adapted to control the transmission of signals in a way that said transmitter transmits at one time a modulated signal using a first carrier with a constant power level and at a different time simultaneously a modulated signal using said first carrier with said constant power level and an identically modulated signal using a further carrier with a constant power level, while no data transmission is ongoing;
detector adapted to detect the transmitted modulated signal using only the first carrier and the sum of the identically modulated signals transmitted simultaneously using the first and the further carrier; and
processor adapted to determine the power of the signal transmitted only using the first carrier detected by the detector and the total power of the sum of the signals transmitted using two carriers detected by the detector, and for subtracting the power of the separately transmitted signal from the total power in order to obtain the power of the signal transmitted using the further carrier,
wherein the system enables a determination of power of a signal transmitted in multicarrier signals such that power and/or gain values may be determined in order to compensate for gain variations in a transmission path to enable efficient power control in the radio transmission unit.

* * * * *